(12) United States Patent
Haimer (10) Patent No.: US 9,004,498 B2
(45) Date of Patent: Apr. 14, 2015

(54) CLAMPING DEVICE AND COLLET CHUCK, BASE AND CHUCK KEY THEREFOR

(75) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 1680 days.

(21) Appl. No.: 12/446,121

(22) PCT Filed: Oct. 25, 2007

(86) PCT No.: PCT/EP2007/009284
§ 371 (c)(1),
(2), (4) Date: Nov. 23, 2009

(87) PCT Pub. No.: WO2008/049621
PCT Pub. Date: May 2, 2008

(65) Prior Publication Data
US 2010/0117311 A1    May 13, 2010

(30) Foreign Application Priority Data

Oct. 26, 2006 (DE) .......................... 10 2006 050 632
Sep. 14, 2007 (DE) .......................... 10 2007 043 889
Sep. 14, 2007 (DE) .......................... 10 2007 043 890

(51) Int. Cl.
*B23B 31/20* (2006.01)
*B25B 13/50* (2006.01)
*F16B 23/00* (2006.01)

(52) U.S. Cl.
CPC ....... *B23B 31/201* (2013.01); *B23B 2260/1388* (2013.01); *B25B 13/50* (2013.01);
(Continued)

(58) Field of Classification Search
CPC .................... B23B 31/201; B23B 2231/2081; B23B 2231/2097
USPC .............. 279/42, 43.1, 43.2, 43.4, 46.2, 46.3, 279/46.4, 48, 52
IPC ...................................................... B23B 31/20
See application file for complete search history.

(56) References Cited

U.S. PATENT DOCUMENTS 2,171,872 A    9/1939    Zimmerman
2,283,888 A    5/1942    Zimmerman
(Continued)

FOREIGN PATENT DOCUMENTS

DE    929840    7/1955
DE    3804043   7/1989
(Continued)

OTHER PUBLICATIONS

ISO 15488—Collets with 8 degree setting angle for tool shanks—Collets, nuts and fitting dimensions"International Standard—ISO, Zuerich, CH 2003".
(Continued)

*Primary Examiner* — Eric A Gates
(74) *Attorney, Agent, or Firm* — Sheridan Ross P.C.

(57) ABSTRACT

The invention relates to a high-precision clamping device for tools in machine tools of the conventional type according to ISO 15488 and to a collet chuck, a base and a tensioning nut. The invention also relates to a chuck key for tightening the locknut without radial stress. The clamping device according to the invention is characterized by a substantially improved runout accuracy, torsional rigidity of the collet chuck and rigidity of the tool clamped therein.

25 Claims, 3 Drawing Sheets

(52) U.S. Cl.
CPC ..... *B25B13/5008* (2013.01); *B23B 2231/2081* (2013.01); *B23B 2260/106* (2013.01); *B23B 2231/2097* (2013.01); *F16B 23/0061* (2013.01)

(56) References Cited

U.S. PATENT DOCUMENTS

| | | | |
|---|---|---|---|
| 2,345,069 A * | 3/1944 | Phillips | 279/52 |
| 2,394,808 A | 2/1946 | Rohr | |
| 2,478,195 A * | 8/1949 | Hull | 279/145 |
| 2,570,752 A * | 10/1951 | Milton et al. | 279/16 |
| 2,749,134 A * | 6/1956 | Penasack | 279/16 |
| 2,803,133 A | 8/1957 | Casady et al. | |
| 3,385,606 A | 5/1968 | Benjamin et al. | |
| 3,540,748 A * | 11/1970 | Buck | 279/155 |
| 3,906,822 A | 9/1975 | Hertelendy et al. | |
| 4,387,906 A * | 6/1983 | Nicolin | 279/2.07 |
| 4,699,388 A * | 10/1987 | Sproccati et al. | 279/48 |
| 4,955,764 A * | 9/1990 | Reinauer | 408/59 |
| 5,028,178 A * | 7/1991 | Ronen | 409/136 |
| 5,192,086 A * | 3/1993 | Bucks | 279/4.09 |
| 5,549,022 A | 8/1996 | Knox | |
| 5,758,883 A * | 6/1998 | Brian | 279/53 |
| 5,788,248 A * | 8/1998 | Gibson | 279/51 |
| 6,155,576 A * | 12/2000 | Yorde | 279/49 |
| 6,832,433 B2 * | 12/2004 | Kramer | 29/558 |
| 6,923,451 B2 * | 8/2005 | Taguchi et al. | 279/42 |
| 7,038,334 B2 * | 5/2006 | Botos et al. | 310/12.06 |
| 7,549,953 B2 * | 6/2009 | Walters | 483/65 |
| 7,673,882 B2 * | 3/2010 | Tanga | 279/52 |
| 8,739,661 B2 | 6/2014 | Haimer | |
| 2006/0115337 A1 | 6/2006 | Higashi | |
| 2010/0148455 A1* | 6/2010 | Taguchi | 279/48 |
| 2011/0158759 A1* | 6/2011 | Jansen et al. | 409/234 |

FOREIGN PATENT DOCUMENTS

| | | |
|---|---|---|
| DE | 4405242 | 8/1995 |
| DE | 19826885 | 12/1999 |
| DE | 69515672 | 9/2000 |
| DE | 202004010714 | 9/2004 |
| DE | 202005003837 | 5/2005 |
| DE | 102005016161 | 10/2006 |
| EP | 0637484 | 2/1995 |
| EP | 0618030 | 6/1997 |
| EP | 834371 A1 * | 4/1998 |
| EP | 1449607 | 8/2004 |
| EP | 1616647 | 1/2006 |
| EP | 1710033 | 10/2006 |
| FR | 1176761 | 4/1959 |
| FR | 2814101 | 3/2002 |
| GB | 293529 | 7/1928 |
| JP | 48-099985 | 12/1973 |
| JP | 57184610 A * | 11/1982 |
| JP | 01-121181 | 5/1989 |
| JP | 01-295704 | 11/1989 |
| JP | 06-277916 | 10/1994 |
| JP | 09155609 A * | 6/1997 |
| JP | 10034411 A * | 2/1998 |
| JP | 2002052431 A * | 2/2002 |
| JP | 2002126919 A * | 5/2002 |
| JP | 2002-166310 | 6/2002 |
| JP | 2002263929 A * | 9/2002 |
| JP | 2004-249440 | 9/2004 |
| JP | 2005-177982 | 7/2005 |
| JP | 2005-313263 | 11/2005 |
| JP | 2009-253965 | 10/2009 |
| WO | WO 9605012 | 2/1996 |
| WO | 02/057039 | 7/2002 |

OTHER PUBLICATIONS

International Search Report prepared by the European Patent Office on Feb. 14, 2008, for International Application PCT/EP2007/009285.

Official Action for U.S. Appl. No. 12/447,231, mailed Jul. 12, 2012, 13 pages.

Final Action for U.S. Appl. No. 12/447,231, mailed Dec. 26, 2012, 13 pages.

Official Action for U.S. Appl. No. 12/447,231, mailed Jul. 3, 2013, 12 pages.

Notice of Allowance for U.S. Appl. No. 12/447,231 mailed Jan. 8, 2014, 11 pages.

Notice of Allowance for U.S. Appl. No. 12/447,231 mailed Mar. 28, 2014, 7 pages.

* cited by examiner

CLAMPING DEVICE AND COLLET CHUCK, BASE AND CHUCK KEY THEREFOR

BACKGROUND OF THE INVENTION

1. Field of the Invention

The invention relates to a clamping device for rotating tools, and in particular to a clamping device that increases related runout accuracy and durability.

2. Technical Background

It is common knowledge that rotating tools, such as drills and especially milling tools, can be held in the clamping device of a machine tool. Such clamping devices, especially so-called ER collet chucks according to ISO 15488, comprise a base, which has a coupling-side end for mounting in a machine tool and a tool-side end, which has a mounting hole which is centric with the axis of the tool and into which a tool shank can be axially inserted from the front end of the tool-side end of the base; a collet chuck which surrounds the shank and is arranged so as to be axially displaceable in the mounting hole and whose outer sleeve has a section which essentially tapers conically from the front end of the base, the outer sleeve supporting itself on a matching tapering conical section of the inner sleeve of the mounting hole; and, a locknut which has an internal thread that engages with an external thread of the base and which forces the collet chuck into the mounting hole axially, relative to the mounting hole. Inserted by its cylindrical shaft into the collet chuck, the tool is clamped radially when the locknut, and on being tightened, forces the collet chuck into the mounting hole and thereby reduces the inner diameter of the collet chuck. The compressibility of the collet chuck is provided by slots penetrating the collet chuck radially.

Known ER collet chucks are very versatile. On account of their generous slot widths, the collets of these ER collet chucks cover a relatively large clamping range in the order of approximately 1 mm, i.e., a clamping device with a mount for tools having a shank diameter of 10 mm can also clamp shank diameters of 9 mm. This is achieved by the fact that, in the case of smaller shank diameters, the collet chuck is forced further into the mounting hole of the base and so closes further in the context of the compressibility afforded by the slots.

The disadvantage of this clamping device, however, is that the chuck has radial support only over a relatively short axial range of the mounting hole. As a result, both the runout accuracy and the rigidity of the clamped tool deteriorate. If, in addition, the insertion depth of the tool shank is less than the axial expansion of the collet chuck, there are areas on the inside of the collet chuck where the tool shank does not make contact. Since, in this area, the clamping force of the collet chuck is not cushioned by the tool shank through support, it can happen that the wall of the collet chuck curves and/or the collet chuck in the mounting hole cants. This reduces not only the runout accuracy as well, but can lead to damage of the collet chuck and base.

The object of the present invention is to eliminate these drawbacks of hitherto conventional clamping devices of this type and thus to increase the runout accuracy and the durability of the clamping device.

SUMMARY OF THE INVENTION

The inventive clamping device for a rotating tool, according to one aspect of the present invention, comprises a base, which has a mounting hole which is centric with the tool's axis of rotation and into which a tool shank can be axially inserted from the front end of the tool-side end of the base, a collet chuck which surrounds the shank and is arranged so as to be axially displaceable in the mounting hole and whose outer sleeve has a section which essentially tapers conically from the front end of the base, said outer sleeve supporting itself on a matching tapering conical section of the inner sleeve of the mounting hole; and a chuck-clamping device, especially a locknut which has an internal thread that engages with an external thread of the base, said chuck-clamping device forcing the collet chuck into the mounting hole axially, relative to the mounting hole. Candidate chuck-clamping devices include devices such as those shown in DE 197 29 249 C2 and DE 44 05 242 A1. In this connection, the inclination angle of the generatrix of the tapering conical section of the mounting hole relative to the rotation axis is greater than 2° and is preferably 8°, especially for the mounting of collet chucks according to ISO 15488. Finally, the collet chuck has a contiguous cylindrical section, i.e. expressed in terms of the front end of the base after the conically tapering section, the cylindrical section forming a fit, especially a transition fit, preferably a joint fit, with a cylindrical section of the bore or mounting hole.

By virtue of the cylindrical section of the collet chuck, which forms a fit with the base, the collet chuck sits more deeply in the base. Furthermore, the collet chuck is supported directly on the base because of the fit. In addition, the collet chuck is centered in the base and tilting of the entire collet chuck is prevented. As a result, influences (for example, arising from an inaccurate locknut thread, etc) which impair the accuracy of tool clamping are diminished, which is why the inventive clamping device has a much higher runout accuracy than conventional clamping devices of this type.

Preferably, distributed about the circumference of the collet chuck are several essentially axially elongated slots, which penetrate the collet chuck radially to some extent and each of which is at least provided in an axial section of the collet chuck, with the number of slots and their width being calculated such that the clamping range of the collet chuck is less than 0.5 mm. While the clamping range of this type is restricted in comparison to conventional clamping devices as a result, the runout accuracy is additionally increased, as tilting errors are diminished even further. This is further boosted by the fact that the cylindrical section of the collet chuck has essentially no slots. Consequently, the collet chuck cannot cant during clamping because it is not flexible in this cylindrical region. In addition, this unslotted cylindrical section provides greater support for the chuck, such that this no longer becomes curved when the insertion depth of the tool shank is shallower than the axial length of the collet chuck. On account of the narrower slots, the torsional rigidity of the collet chuck is additionally increased.

It is also possible to provide slots about the circumference of the collet chuck and having a greater radial component, wherein, for the purpose of achieving compressibility, the axial component may not be too small.

In one embodiment, the collet chuck, with regard to the minimum insertion depth of the tool, has two different types of slots, wherein the first type of slot extends from the, relative to the tool mount, front end of the collet chuck as far as an axial position, which is less than the minimal insertion depth, while the second type of slot is spaced apart from the front end of the collet chuck. As a result, there is no continuous slot in the collet chuck, thereby increasing the rigidity of the collet chuck. Further, on account of the axial position of the tool shank, liquids are prevented from exiting the mounting hole and passing the tool and into the tool working area. Conventional collet chucks of this type achieved this objective only by incorporating sealing washers between locknut and collet chuck. Moreover, if at least some of the slots of the second type, with regard to the front end of the collet chuck, each open into relief bores at their rear end, then fewer symptoms of fatigue occur in the transition region between the slotted and unslotted material of the collet chuck.

In another embodiment, relative to the circumference of the collet chuck, a slot of the second type is arranged between each of two slots of the first type if the slot of the first type is axially equally as long as or shorter than that of the second type, or, relative to the circumference of the collet chuck, a slot of the first type is arranged between each of two slots of the second type if the slot of the first type is longer than that of the second type, such that, viewed over the full circumference of the collet chuck, there are twice as many of the shorter slots present relative to the longer slots. This ensures that, in the case of the shorter slots, less compression occurs, and therefore fatigue in the transition region from the short slots to the collet chuck material is reduced. The additional incorporation of radial relief bores in the transition region from slots of the first type to slots of the second type, into which the short slots open, can reduce material fatigue still further. In addition, of course, such relief bores can be provided at some or all of the other ends of all slots.

In yet another embodiment, contiguous with the front end of the collet chuck, a section of its outer sleeve expanding conically from the front end of the collet chuck supports itself on a matching expanding conical section of the inner sleeve of the locknut, wherein the inclination angle of the generatrixes of the conically expanding section of the collet chuck relative to the rotation axis is preferably 30° and, arranged in the transition region between the conically expanding and the conically tapering section of the collet chuck, is a groove with which a projection of the locknut engages. The overlapping region of the slots of the first and second type is arranged so as not to lie in the groove. Thus, given sufficient insertion depth of the tool shank, liquid can be prevented from exiting the mounting hole through the slots past the tool and into the tool working area. In a preferred embodiment, the overlapping region lies between the groove and the front end of the collet chuck. Here, the slots are already sealed against each other at a very short clamping length of the tool shank. Moreover, the torsional rigidity increases with increase in proximity of the overlapping region between the slots of the first and the second type to the front end of the collet chuck.

In another embodiment, the rear circumferential surface of the groove, with regard to the front end of the collet chuck, has, with regard to the front end of the base in the unclamped state, an axial spacing of less than 5 mm, preferably less than 2 mm. Unlike conventional clamping devices of this type, the collet chuck thus projects less from the base, with the result that clamping of the tool is more accurate and more rigid. Furthermore, as a result, the locknut, from an axial point of view, has a shorter distance to the front end of the base than is the case for conventional clamping devices of this type. In the conventional type, due to the relatively large distance, it can happen that the collet chuck is forced even deeper into the base beyond the actual clamping range, a fact which can cause damage to the collet chuck, since the permissible travel is exceeded. In the above advantageous embodiment of the inventive clamping device, the locknut has a shorter distance from the front end of the base, such that the locknut comes to rest against the base before damage can occur in the collet chuck.

In another embodiment of the inventive clamping device, the radial wall thickness of the base at its front end is equal to or greater than the average radial wall thickness of the locknut or, relative to ISO 15488, the outer diameter of the base is enlarged at its front end while the average outer diameter of the locknut is maintained. As a result, the disadvantage of conventional clamping devices of this type is eliminated, namely that, because of the relatively small wall thickness of the base in comparison to the average outer diameter of the locknut, the base can break at high stress. In this embodiment, the wall thickness of the base is larger and the wall thickness of the locknut smaller, such that the clamping device has greater strength for the same external circumference contour of the locknut. It is important to emphasize that the outer contour of the locknuts of such clamping devices is standardized and must be maintained in order that interfering edges during milling may be avoided.

Another aspect of the present invention is a locknut of the clamping device that has the outer circumferential contour of an odd-numbered polygon or is executed as a circular outer circumferential contour with an odd number of axial grooves equally spaced about the circumference. The term "circular" in this context comprises essentially circular, i.e. outer circumferential contours in the form of polygons and the like. This design ensures that conventional chuck keys cannot be used for clamping the tools. The user is thus directly prevented from inadvertent use of such chuck keys in order that potential damage to the clamping device may be avoided, especially to the threads of the locknut of the inventive clamping device. Alternatively, the locknut can have an even number of grooves instead of an odd number. In order that conventional chuck keys may not be used nonetheless, the axial grooves must have a curvilinear cross-section. This embodiment causes common chuck keys that are designed as hook wrenches, slip off the locknut. Of course, this design of the groove cross-section can also be provided in the case of the locknut with an odd number of grooves.

Advantageously, the grooves are equipped with a phase, such that inventive chuck keys can be easily applied on one hand and, on the other, conventional chuck keys slip off even more readily. Especially preferably, the grooves extend only over an axial area of the nut, said area being smaller than the axial extension of the nut itself. This ensures that the grooves within the outer circumferential contour of the locknut are limited on one side and thus have a unilateral axial stop for a chuck key. This can render clamping of the locknut even safer.

In another embodiment, the thread between base and locknut is of a multiple design, especially having two or three threads. Multiple threads offer especially symmetrical force transmission, a fact which leads to better centering accuracy.

Advantageously, the pitch of the multiple thread remains the same relative to a standard single thread. As a result, the same tightening torque yields the same tightening force.

Further, independent protection is claimed for collet chucks. More precisely, in a first aspect for a collet chuck for the inventive clamping device, as described above. This collet chuck has all the characteristics of this clamping device related to the collet chuck.

Another aspect of the present invention is a collet chuck, which also has the characteristics of the inventive clamping device that relate to the collet chuck, with the exception of that characteristic which consists in the collet chuck's having a contiguous cylindrical section, i.e. expressed in terms of the front end of the base after the conically tapering section, said cylindrical section forming a fit, especially a transition fit, preferably a joint fit, with a cylindrical section of the bore. This inventive collet chuck can be used not only in the inventive clamping device, but also in the conventional clamping devices of this type, wherein some of the advantages described above, such as improvement in runout accuracy, torsional rigidity and tilting resistance also accrue and liquid tightness is also attained.

Another aspect of the present invention is a chuck key that has at least two opposing grips arranged on a line of action relative to the pivot point of the chuck key, wherein the chuck key is adapted to the outer circumferential contour of the locknut such that a torque on the locknut for tightening or loosening the locknut relative to the base can be provided. This chuck key, which can be used especially for tightening and loosening the inventive locknut in the inventive clamping device, allows precise turning of the locknut under application of a torque, while preventing transverse forces, which can lead to tilting of the nut and thus of the collet chuck within the clamping device and so can reduce the runout accuracy.

A further advantage of the inventive clamping device and specifically of the inventive base is that collet chucks for clamping devices of the conventional type can be used in the base. Users are therefore not forced to relinquish their collet chucks, some of which exist in numerous designs, but can continue to use them and then gradually replace them with the inventive collet chucks if they seek to avail of all the advantages pertaining to runout accuracy, torsional rigidity and tilting resistance as well as liquid tightness. The design of the inventive collet chuck with the cylindrical section in turn rules out the possibility that this collet chuck is used in clamping devices of the conventional type, and so damage to the base and the locknut can be prevented.

Further advantages, characteristics and features of the present invention will become clear from the following description in connection with the figures.

DETAILED DESCRIPTION OF THE PREFERRED EMBODIMENTS

Figure 1:
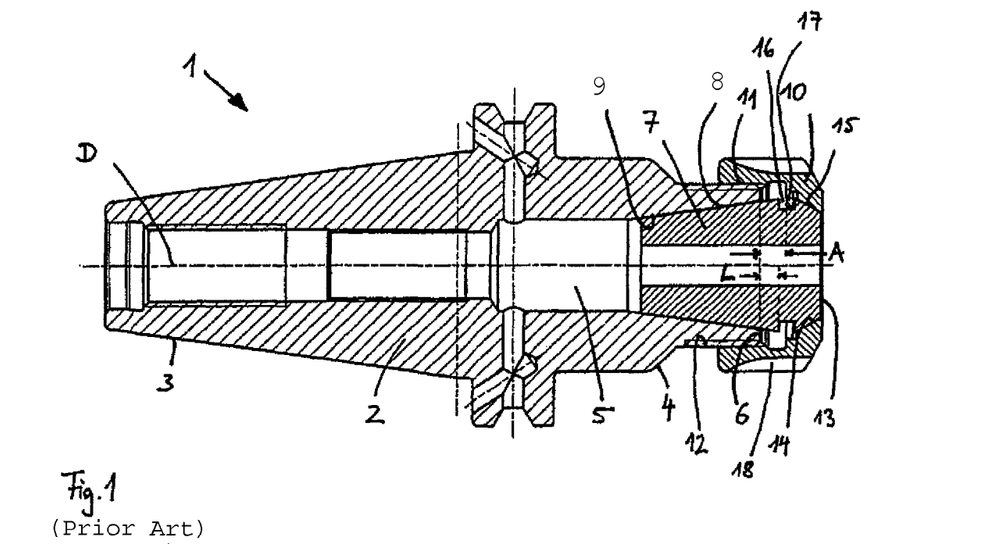
FIG. 1 is a clamping device of the conventional type.

FIG. 1 is a schematic drawing of a clamping device 1 of the conventional type in accordance with ISO 15488. This clamping device 1 consists of a base 2 which has a coupling-side end 3 for mounting in a machine tool and a tool-side end 4 that has a mounting hole 5, which is centric with the tool's axis of rotation axis D and into which a tool shank (not shown) can be axially inserted from the front end 6 of the tool-side end 4 of the base 2. Furthermore, the mounting hole 5 has an axially movable collet chuck 7, which surrounds the shank and whose outer sleeve has a section 8 that essentially tapers conically from the front end 6 of the base 2, said outer sleeve supporting itself on a matching tapering conical section 9 of the inner sleeve of the mounting hole 5. Finally, the conventional clamping device 1 also comprises a locknut 10, which has an internal thread 11 that engages with an external thread 12 of the base 2, and which forces the collet chuck 7 axially, relative to the mounting hole, into this. Inserted by its cylindrical shaft into the collet chuck 7, the tool is clamped radially when the locknut 10, on being tightened, forces the collet chuck 7 into the mounting hole 5 and thereby reduces the inner diameter of the collet chuck 7. The compressibility of the collet chuck 7 is provided by slots (not shown) penetrating the collet chuck 7 radially.

The collet chuck 7 of this conventional clamping device 1 has a section 14, which expands conically from the front end 13 and which supports itself on a matching conically expanding section 15 of the locknut 10. As a result, the centering accuracy of the collet chuck 7 is increased when the locknut is being screwed on. In the transition region between conically tapering 8 and expanding section 14, the collet chuck 7 has a circumferential groove 16 with which a projection 17 of the locknut 10 engages in order that the clamped collet chuck 7 may be forcibly loosened as the locknut 10 is being loosened.

It can be seen that, in this conventional clamping device 1, the distance L of the groove from the front end 6 of the base 2, and thus the distance A of the locknut 10 from the front end 6 is relatively large. This is necessary because the collet chuck 7 covers a large clamping range of approximately 1 mm. The disadvantage, however, is that the collet chuck 7 is axially supported only over a relatively short axial range. As a result, the runout accuracy as well as the rigidity of the clamped tool are reduced. The runout accuracy of tools clamped in such conventional clamping devices 1 is approximately 0.01 to 0.05 mm.

A further disadvantage is that in the case of tools which have a shallow clamping depth, the collet chuck 7 is supported radially only over a short axial range, such that the clamping force is not cushioned. This can lead on one hand to canting of the collet chuck 7 in the base 2 that diminishes the runout accuracy and, on the other, to deformation and damage to the collet chuck 7 and the base 2.

Moreover, the wall in the region of the front end 6 of the base 2 is relatively thin in comparison to the average (this can apply both to locknuts 10 having a circular outer circumferential contour with incorporated axial grooves 18, as indicated in FIG. 1, and an outer circumferential contour in the form of an even-numbered polygon) outer diameter of the locknut 10 and relative to the wall thickness of the locknut 10. The result is that the base 2 can break at high stress.

Finally, the relatively large distance A between the locknut 10 and the front end 6 of the base 2 means that the collet chuck 7 can be pushed beyond its actual clamping range even deeper into the base 2, as a result of which the permissible travel is exceeded and damage to the collet chuck 7 can occur.

Figure 2:
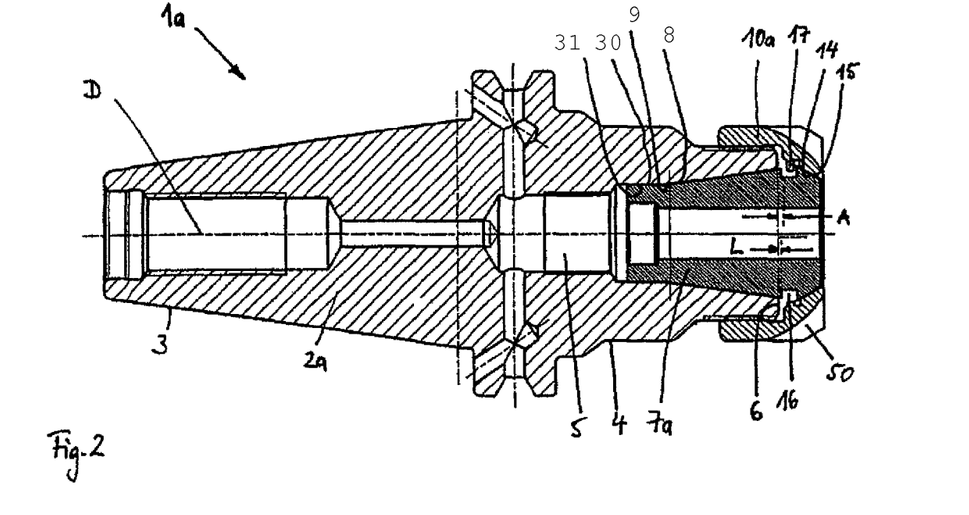
FIG. 2 is an embodiment of the inventive clamping device.

FIG. 2 shows in schematic form an embodiment of the inventive clamping device 1a, which corresponds to the type of so-called ER collet chucks according to ISO 15488, wherein similar elements have been given the same reference number as in FIG. 1. It can be clearly seen that the inventive collet chuck 7a has a cylindrical section 30, which is contiguous with the conically tapering section 8 and which forms a fit with the cylindrical section 31 of the mounting hole 5 of the inventive base 2a, wherein the cylindrical section 8 itself essentially has no slots (see FIG. 3). As a result, the collet chuck 7a cannot cant when a short tool shaft is clamped in the conically tapering section 9 of the base 2a, since the cylindrical section 30 of the collet chuck 7a is not flexible. This non-flexible cylindrical section 30 also effectively prevents bulging and thus damage to the collet chuck 7a. Expediently, the cylindrical section 30 in the embodiments shown is also spherically turned in order that insertion of the clamping device into the base may be facilitated, as shown for example in FIG. 3.

Figure 3:
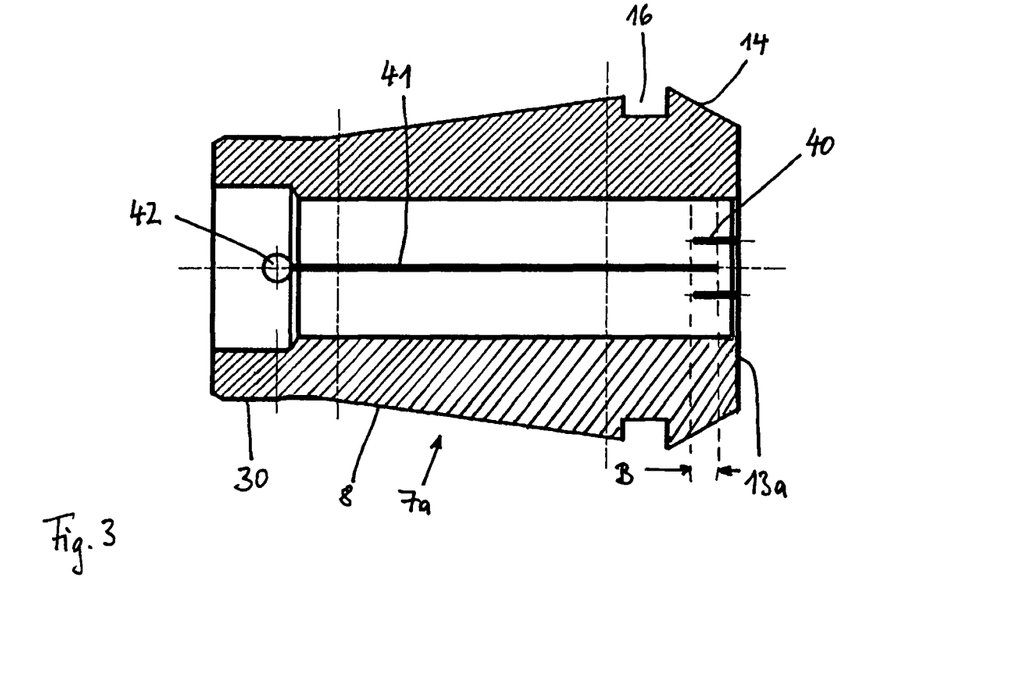
FIG. 3 is a longitudinal cross-sectional view of an embodiment of the inventive collet chuck for the inventive clamping device in accordance with FIG. 2.
Figure 4:
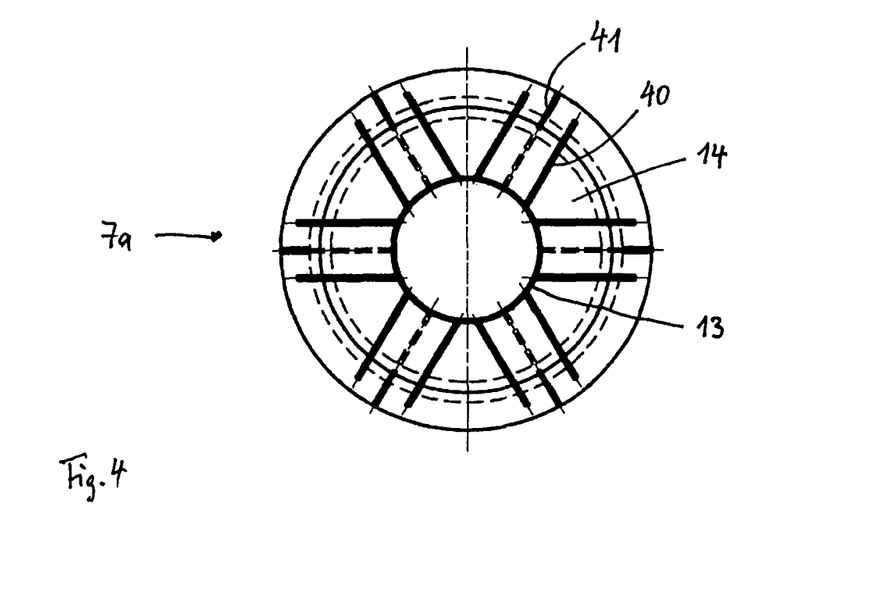
FIG. 4 is a plan view of the conically expanding section of the collet chuck of FIG. 3.

Furthermore, as a result of the modified, i.e. only narrow, slotting shown purely schematically in FIGS. 3 and 4, the clamping range of the collet chuck 7a is markedly reduced relative to conventional collet chucks 7. This also increases the runout accuracy. Overall, the runout accuracy of tools clamped in the inventive clamping device is improved to about 5 μm relative to tools clamped in conventional clamping devices 1.

Finally, the inventive collet chuck 7a sits deeper in the base 2a, as a result of which, in comparison to the distances in the conventional type 1, both the distance L of the groove 16 from the front end 6 of the base 2a and the distance A of the locknut 10a from the front end 6 is only very slight. As a result, clamping of the tool is more accurate and more rigid. Moreover, the locknut 10a makes contact with the base 2a before the permissible travel is exceeded and thus before damage to the collet chuck 7a can arise.

The wall thickness of the base 2a in the region of the front end 6 is thicker compared with the average outer diameter of the locknut 10a, said diameter being the same as in the conventional type 1 of FIG. 1, with the wall of the locknut 10a being slightly thinner than in the conventional type 1. As a result, the clamping device 1a has greater strength for the same outer circumferential contour of the locknut 10a.

In the conically tapering section 9 of the mount 5 of the collet chuck 7a, the inner contour of the base 2a is essentially identical with the base 2 of the conventional type 1 according to FIG. 1. In other words, only the axial length of the conically tapering section 9 is less and contiguous with that extends the cylindrical section 31. As a result, it is possible to clamp conventional collet chucks 7 in the base 2a of the inventive clamping device 1a, large numbers of said collet chucks being available in virtually all shops. In this way, highly versatile use can be made of the base 2a together with the locknut 10a. On the other hand, on account of the cylindrical section 30, the inventive collet chuck 7a cannot be used in clamping devices 1a of the conventional type according to FIG. 1, as a result of which damage to the inventive collet chuck 7a in these conventional clamping devices 1 is prevented.

In FIGS. 3 and 4, which show a cross-sectional view of the embodiment of the inventive collet chuck 7a and a plan view of the front end 13a of the collet chuck 7a, the configuration of symmetrically arranged, axially incorporated slots of the first 40 and second type 41 can be clearly seen, wherein the slots 41 of the second type are much longer and, at the transition of the conically tapering section 8 of the collet chuck 7a to the cylindrical section 30, open into relief bores. Both the slots 40, 41 and the relief bores 42 extend radially through the entire wall of the collet chuck 7a. The transition region B between the slots of the first type 40 and second type 41 is located above the groove 16 in the conically expanding section 14 in the immediate vicinity of the front end 13 of the collet chuck 7a. In this way, the collet chuck 7a not only has a very high torsional rigidity, but also is liquid-tight within the clamping device 1a since, even in the event of an extremely short tool shank insertion depth that is less than the axial length of the conically expanding section 14 of the collect chuck, the slots are sealed against each other. Liquid which penetrates into the slots of the second type 41 is thus prevented from passing into the slots of the first type 40 or passing the tool shank into the tool working space.

The slots of the first type 40 are arranged on either side of a slot of the second type 41, as a result of which there are twice as many of them. Despite their only relatively short execution, this ensures that fatigue due to clamping does not occur in the transition region from slot 40 to material of the collet chuck 7a. The inventive locknut 10a has an outer circumferential contour either in the form of an odd-numbered polygon or a circular outer circumferential contour with a number of odd-numbered grooves 50 spaced equally about the circumference (indicated in FIG. 2). Consequently, only the inventive chuck key (not shown) can be used for tightening or loosening the inventive locknut 10a. In contrast to the one-armed chuck keys for locknuts 10 of the conventional type 1, this inventive chuck key has at least two opposing grips arranged on a line of action relative to the pivot point of the chuck key. In this connection, the chuck key is adapted to the outer contour of the locknut 10a, such that a torque can be provided at the locknut 10a for the purpose of tightening or loosening the locknut 10a relative to the base 2a. With this chuck key, locknuts 10a can be tightened without radial stress, as a result of which the runout accuracy of the clamping device 1a is additionally increased.

Figure 5:
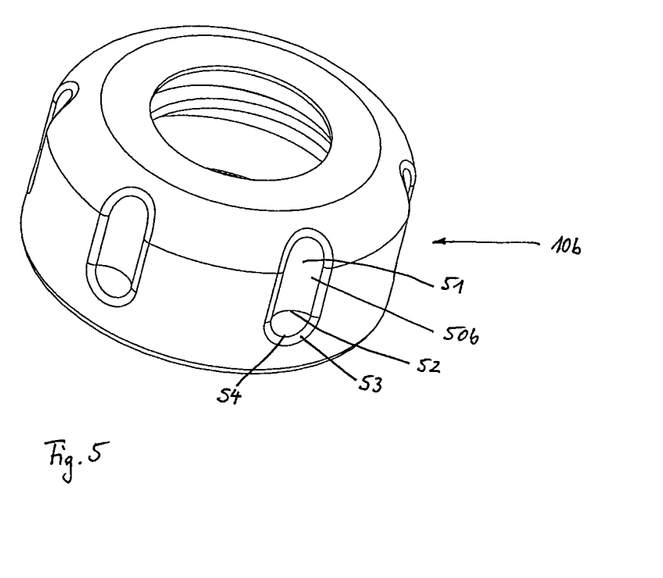
FIG. 5 is a perspective view of an alternative embodiment of an inventive locknut.

FIG. 5 shows a purely schematic, perspective view of locknut 10b by way alternative to locknut 10a. Locknut 10b has a circular outer circumferential contour, in which are arranged an even-numbered number of grooves 50b uniformly radially spaced. Each groove 50b has an curvilinear cross-section 51, which is incorporated axially to locknut 10b into the outer circumferential contour, as shown by the drawn line 52. Around each of the grooves 50b is provided a phase 53. The design of the grooves 50b ensures that a conventional chuck key cannot be used despite the even number of grooves 50b. The grooves 50b have an axial stop 54, too, which axially limits the grooves 50b relative to the locknut 10b and so forms a stop for the inventive chuck key.

From the foregoing deliberations, it has become clear that the inventive clamping device 1a with the inventive elements collet chuck 7a, base 2a and locknut 10a, 10b have numerous advantages over those of the conventional type 1 and can be used in a particularly versatile and economical manner.

There follow, purely by way of example for certain applications, tabular data in mm for the diameter of the cylindrical section or journal 30 as well as the length of the cylindrical section or turning 30, more precisely for collet chucks of size ER16, ER25 and ER32. To each of these nominal sizes 16, 25 and 32 is assigned a maximum clamping diameter for the collet chuck, which is indicated in the following table by "max. ClampØ". For the cylindrical section, the term journal is used in the following Table 1, with a minimum and maximum journal diameter stated for the respective collet chucks, and especially an actual value for the journal diameter which is indicated as preferable. The same is also quoted for the length of the cylindrical section or the journal length. All values are in millimeters.

| Nominal Size | max. Clamp Ø | Journal Ø min. | Journal Ø max. | Journal Ø actual | Journal length min. | Journal length max. | Journal length actual |
|---|---|---|---|---|---|---|---|
| 16 | 10 | 11 | 14 | 12 | 1 | 20 | 8.5 |
| 25 | 16 | 18.5 | 21 | 19.05 | 1 | 20 | 8.3 |
| 32 | 20 | 24 | 29 | 25 | 1 | 25 | 10.4 |

Further, the following Table 2 yields the thread sizes for the locknut 10a and the base 2a (internal thread 11a, external thread 12a according to FIG. 2).

TABLE 2

| Nominal size | Thread |
|---|---|
| 16 | M 24 × 1.5 |
| 25 | M 34 × 1.5 |
| 32 | M 42 × 1.5 |

The invention claimed is:

1. A clamping device for a rotating tool comprising:
a base including a mounting hole which is centric with an axis of rotation of the tool and which is adapted to axially receive a tool shank from a front end of the base;
a collet chuck which surrounds the tool shank and is arranged so as to be axially displaceable in the mounting hole, the collet including an outer sleeve having a section which substantially tapers conically from the front end of the base, the outer sleeve supported on a matching tapering conical section of an inner sleeve of the mounting hole;
a chuck-clamping device including a locknut which has an internal thread that engages with an external thread of the base, the chuck-clamping device forcing the collet chuck into the mounting hole axially, relative to the mounting hole, wherein the inclination angle of the generatrix of the tapering conical section of the mounting hole relative to the axis of rotation of the tool is greater than 2°, wherein the collet chuck has a contiguous cylindrical section forming a fit with a cylindrical section of the mounting hole of the base, the collet chuck further including a plurality of axially elongated slots extending radially into an axial section of the collet chuck and each having a width, wherein the number of the slots and the width of the slots are provided such that a clamping range of the collet chuck is less than 0.5 mm;
wherein the slots of the collet chuck include a first type of slot that extends from a front end of the collet chuck to a depth that is less than a minimum insertion depth of the tool, and a second type of slot that is spaced apart from the front end of the collet chuck and extends in the direction of the cylindrical section, the first type of slot having a first length and the second type of slot having a second length that is greater than the first length; and
wherein liquids are prevented from exiting the mounting hole and passing the tool and into a tool working area.

2. The clamping device of claim 1, wherein the cylindrical section of the collet chuck does not include the slots.

3. The clamping device of claim 1, wherein at least several of the second slots open into relief bores at at least a select one of opposite ends of the slots.

4. The clamping device of claim 1, wherein the collet chuck includes at least a select one of a slot arrangement including a first arrangement, wherein a slot of the second type is arranged between each of two slots of the first type in a circumferential direction if the slots of the first type are axially equally as long as or shorter than that of the second type, and a second slot arrangement, wherein a slot of the first type is arranged between each of two slots of the second type in a circumferential direction, such that there are twice as many of slots of a first length than slots of a second length.

5. The clamping device of claim 1, wherein contiguous with the front end of the collet chuck, a section of the outer sleeve expanding conically from a front end of the collet chuck is supported on a matching expanding conical section of the inner sleeve of the locknut, and arranged in the transition region between the conically expanding and the conically tapering section of the collet chuck, is a groove with which a projection of the locknut engages and wherein an overlapping region of the slots is arranged axially and not inside the circumferential groove.

6. The clamping device of claim 5, wherein the rear radial side of the groove has an axial spacing of less than 5 mm relative to the front end of the base in an unclamped state.

7. The clamping device of claim 6, wherein the axial spacing between the rear radial side of the groove relative to the front end of the base in an unclamped state is less than 2 mm.

8. The clamping device of claim 5, wherein the inclination angle of the generatrices of the conically expanding section of the collet chuck relative to the axis of rotation of the tool is about 30°.

9. The clamping device of claim 5, wherein the overlapping region of the slots is arranged between the groove and the front end of the collet chuck.

10. The clamping device of claim 1, wherein a radial wall thickness of the base at a front end of the base is equal to or greater than an average radial wall thickness of the locknut.

11. The clamping device of claim 1, wherein the collet chuck has the outer circumferential contour that includes an even number of axial grooves equally spaced about the circumference.

12. The clamping device of claim 1, wherein multiple threads are provided between locknut and the base.

13. The clamping device of claim 1, wherein the inclination angle of the generatrix of the tapering conical section of the mounting hole relative to the axis of rotation of the tool is about 8°.

14. The clamping device of claim 1, wherein the fit between the contiguous cylindrical section of the collet chuck and the cylindrical section of the mounting hole is a transition fit.

15. The clamping device of claim 1, wherein the cylindrical section of the collet chuck is spherically turned.

16. The clamping device of claim 1, wherein the second type of slot is at least twice as long as the length of the second type of slot.

17. The clamping device of claim 1, wherein the second type of slots have first ends that terminate in the section which substantially tapers conically from the front end, and second ends that terminate in the cylindrical section.

18. The clamping device of claim 1, wherein the first type of slots have first ends that terminate at the front end, and second ends that terminate in the section which substantially tapers conically from the front end.

19. The clamping device of claim 1, wherein the first type of slots extend less than half the length of the collet chuck, and the second type of slots extend more than half the length of the collet chuck.

20. A collet chuck adapted to surround a shank of a supported tool and to be axially displaceable in a mounting hole of a base of a rotating tool, comprising:
an outer sleeve having a section which tapers conically, the outer sleeve adapted to be supported on a matching tapering conical section of an inner sleeve of a mounting hole of a base;
a contiguous cylindrical section adapted to form a fit with a cylindrical section of a mounting hole of a base;
a plurality of axially elongated slots extending radially into an axial section of the collet chuck and each having a width, wherein the number of the slots and the width of the slots are provided such that a clamping range of the collet chuck is less than 0.5 mm;
wherein the slots of the collet chuck include a first type of slot that extends from a front end of the collet chuck to a depth that is less than a minimum insertion depth of the tool, and a second type of slot that is spaced apart from the front end of the collet chuck and extends in the direction of the cylindrical section, the first type of slot having a first length and the second type of slot having a second length that is greater than the first length; and wherein liquids are prevented from exiting the mounting hole and passing the tool and into a tool working area.

21. The collet chuck in accordance with claim 20, wherein the collet chuck has a nominal size of a select one of 16 mm, 25 mm and 32 mm, wherein the collet chuck having a nominal size of 16 mm has a maximum clamping diameter of 10 mm, a journal diameter of within a range of 11 to 14 mm, and a journal length of within a range of from 1 to 20 mm, the collet chuck having a nominal size of 25 mm has a maximum clamping diameter of 16 mm, a journal diameter of within a range of from 18.5 to 21 mm, and a journal length of within a range of from 1 to 20 mm, and the collet chuck having a nominal size of 32 mm has a maximum clamping diameter of 20 mm, a diameter of the journal of within a range of from 24 to 29 mm, and a journal length of within a range of from 1 to 25 mm.

22. The collet chuck of claim 21, wherein the collet chuck having a nominal size of 16 mm has a journal diameter of 12 mm, and a journal length of 8.5 mm.

23. The collet chuck of claim 21, wherein the collet chuck having a nominal size of 25 mm has a journal diameter of 19.05 mm, and a journal length of 8.3 mm.

24. The collet chuck of claim 21, wherein the collet chuck having a nominal size of 32 mm has a journal diameter of 25 mm and a journal length of 10.4 mm.

25. A clamping device for a rotating tool comprising:
a base including a mounting hole which is centric with an axis of rotation of the tool and which is adapted to axially receive a tool shank from a front end of the base;
a collet chuck which surrounds the tool shank and is arranged so as to be axially displaceable in the mounting hole, the collet including an outer sleeve having a section which substantially tapers conically from the front end of the base, the outer sleeve supported on a matching tapering conical section of an inner sleeve of the mounting hole;
a chuck-clamping device including a locknut which has an internal thread that engages with an external thread of the base, the chuck-clamping device forcing the collet chuck into the mounting hole axially, relative to the mounting hole, wherein the inclination angle of the generatrix of the tapering conical section of the mounting hole relative to the axis of rotation of the tool is greater than 2°, wherein the collet chuck has a contiguous cylindrical section forming a fit with a cylindrical section of the mounting hole of the base, the collet chuck further including a plurality of axially elongated slots extending radially into an axial section of the collet chuck and each having a width, wherein the number of the slots and the width of the slots are provided such that a clamping range of the collet chuck is less than 0.5 mm;
wherein the slots of the collet chuck include a first type of slot that extends from a front end of the collet chuck to a depth that is less than a minimum insertion depth of the tool, and a second type of slot that is spaced apart from the front end of the collet chuck and extends in the direction of the cylindrical section; and
wherein the collet chuck includes at least a select one of a slot arrangement including a first arrangement, wherein a slot of the second type is arranged between each of two slots of the first type in a circumferential direction if the slots of the first type are axially equally as long as or shorter than that of the second type, and a second slot arrangement, wherein a slot of the first type is arranged between each of two slots of the second type in a circumferential direction if the slot of the first type is longer than that of the second type, such that, viewed over the full circumference of the collet chuck, there are twice as many of shorter slots present relative to longer slots.

\* \* \* \* \*